United States Patent
Lauster (10) Patent No.: US 10,966,078 B2
(45) Date of Patent: Mar. 30, 2021

(54) EMERGENCY NETWORK SLICE AND METHOD FOR PROCESSING AN EMERGENCY COMMUNICATION IN A PACKET SWITCHED COMMUNICATION NETWORK

(71) Applicant: Deutsche Telekom AG, Bonn (DE)

(72) Inventor: Reinhard Lauster, St. Poelten (AT)

(73) Assignee: DEUTSCHE TELEKOM AG, Bonn (DE)

( * ) Notice: Subject to any disclaimer, the term of this patent is extended or adjusted under 35 U.S.C. 154(b) by 0 days.

(21) Appl. No.: 16/955,805

(22) PCT Filed: Oct. 24, 2018

(86) PCT No.: PCT/EP2018/079176
§ 371 (c)(1),
(2) Date: Jun. 19, 2020

(87) PCT Pub. No.: WO2019/120694
PCT Pub. Date: Jun. 27, 2019

(65) Prior Publication Data
US 2021/0021981 A1    Jan. 21, 2021

(30) Foreign Application Priority Data
Dec. 22, 2017   (EP) .................................... 17210112

(51) Int. Cl.
*H04W 4/90*       (2018.01)
*H04W 76/50*      (2018.01)
(Continued)

(52) U.S. Cl.
CPC .............. *H04W 4/90* (2018.02); *H04W 4/029* (2018.02); *H04W 36/0066* (2013.01);
(Continued)

(58) Field of Classification Search
None
See application file for complete search history.

(56) References Cited

U.S. PATENT DOCUMENTS 10,798,639 B2 *  10/2020  Chun .................... H04W 48/08
2009/0316683 A1  12/2009  Gass et al.
(Continued)

OTHER PUBLICATIONS

Manic, et al. "Next Generation Emergency Communication Systems via Software Defined Networks," 2014 *Third Geni Research and Educational Experiment Workshop IEEE*: 1-8 (Mar. 19, 2014). XP032629026.

(Continued)

*Primary Examiner* — German Viana Di Prisco
(74) *Attorney, Agent, or Firm* — Leydig, Voit & Mayer, Ltd.

(57) ABSTRACT

A method for processing an emergency message in a communication network includes: transmitting, by a user equipment (UE), an emergency message to an access network entity of a network slice of the communication network, wherein the emergency message comprises an emergency identifier (E_ID); detecting by the access network entity of the network slice of the communication network, based on the E_ID, that the emergency message is related to an emergency; forwarding the emergency message to an emergency network slice of the communication network based on the emergency detection; and establishing, by the emergency network slice, a communication link between the UE and a public safety answering point (PSAP) for processing the emergency message.

15 Claims, 4 Drawing Sheets

(51) Int. Cl.
  *H04W 36/00* (2009.01)
  *H04W 40/02* (2009.01)
  *H04W 4/029* (2018.01)
  *H04W 36/14* (2009.01)
  *H04W 84/04* (2009.01)

(52) U.S. Cl.
  CPC ........... *H04W 36/14* (2013.01); *H04W 40/02* (2013.01); *H04W 76/50* (2018.02); *H04W 84/042* (2013.01)

(56) References Cited

U.S. PATENT DOCUMENTS

| | | | |
|---|---|---|---|
| 2009/0323672 A1 | 12/2009 | Canpolat et al. | |
| 2017/0245176 A1* | 8/2017 | Murphy | H04W 28/08 |
| 2018/0288582 A1* | 10/2018 | Buckley | H04W 48/14 |
| 2019/0021037 A1* | 1/2019 | Shaw | H04W 36/36 |
| 2019/0246334 A1* | 8/2019 | Wang | H04W 48/08 |
| 2019/0373520 A1* | 12/2019 | Sillanpaa | H04W 36/14 |

OTHER PUBLICATIONS

Anonymous, "Analysis and Way Forward in 5G Support for Emergency Session," *3rd Generation Partnership Project (3GPP)*, (Nov. 25, 2017). XP051379926.

Anonymous, "3rd Generation Partnership Project; Technical Specification Group Services and System Aspects; System Architecture for the 5G System; Stage 2 (Release 15)," *3rd Generation Partnership Project (3GPP)* SA WG2, V2.0.1: 1-183 (Dec. 15, 2017). XP051391985.

Manic, "Network Slicing for Emergency Communications," 1-71 (Aug. 29, 2017). XP055468536.

\* cited by examiner

EMERGENCY NETWORK SLICE AND METHOD FOR PROCESSING AN EMERGENCY COMMUNICATION IN A PACKET SWITCHED COMMUNICATION NETWORK

CROSS-REFERENCE TO PRIOR APPLICATIONS

This application is a U.S. National Phase Application under 35 U.S.C. § 371 of International Application No. PCT/EP2018/079176, filed on Oct. 24, 2018, and claims benefit to European Patent Application No. EP 17210112.3, filed on Dec. 22, 2017. The International Application was published in English on Jun. 27, 2019 as WO 2019/120694 A1 under PCT Article 21(2).

TECHNICAL FIELD

The invention relates to an emergency network slice and techniques for processing an emergency communication in a packet switched communication network, in particular in a local communication network. The invention further relates to processing an emergency message for a roaming user equipment (UE) in a visited communication network.

BACKGROUND

Operators worldwide are currently preparing for the transition to 5G networks. To support the wide range of services planned for 5G, a new core network known as Next-Generation Core or NG Core is planned. Its structure is described, for example, in the technical specification TS 23.501 (V1.5.0) of 3GPP. It specifies requirements for designing and operating a 5G service-oriented core network.

The service-oriented 5G core network is based on the premise that 5G shall support very different services with very different performance requirements. Three different service categories for 5G are identified: 1) Enhanced Mobile Broadband (eMBB), 2) Massive machine-type communication (mMTC, also known as IoT, Internet of Things) and 3) Ultra-Low Latency (UR-LLC) communication.

This includes use cases or application scenarios such as industrial control, augmented reality (AR) or augmented reality/virtual reality (VR) and networked cars. The goal is to use end-to-end network slices to map and support these diverse services and technologies on a physical network infrastructure. In this way, operators can operate new services in foreign network sectors and insert their networks into new industrial value chains.

Emergency calls are usually made via a local instance of a voice over Internet Protocol (VoIP) system that routes these emergency calls to the assigned Public Safety Answering Point (PSAP). One problem in the case of roaming is that the emergency call always has to be handled by the local network.

SUMMARY

In an exemplary embodiment, the present invention provides a method for processing an emergency message in a communication network, in particular a local public land mobile network (PLMN). The method includes: transmitting, by a user equipment (UE), an emergency message to an access network entity of a network slice of the communication network, wherein the emergency message comprises an emergency identifier (E_ID); detecting by the access network entity of the network slice of the communication network, based on the E_ID, that the emergency message is related to an emergency; forwarding the emergency message to an emergency network slice of the communication network based on the emergency detection; and establishing, by the emergency network slice, a communication link between the UE and a public safety answering point (PSAP) for processing the emergency message.

BRIEF DESCRIPTION OF THE DRAWINGS

Embodiments of the present invention will be described in even greater detail below based on the exemplary figures. The present invention is not limited to the exemplary embodiments. All features described and/or illustrated herein can be used alone or combined in different combinations in embodiments of the present invention. The features and advantages of various embodiments of the present invention will become apparent by reading the following detailed description with reference to the attached drawings which illustrate the following.

DETAILED DESCRIPTION

Exemplary embodiments of the present invention improve the serving of an emergency call for a UE in a local communication network, e.g. a roaming UE in a visited public land mobile network (PLMN), and increase the performance and flexibility of emergency service, especially when roaming in the above described 5G communication networks.

Exemplary embodiments of the present invention also simplify the 5G roaming architecture with respect to emergency services.

Exemplary embodiments of the present invention provide an emergency call slice (that may include a RAN and a core network slice) so that the emergency call does not leave the slice and can be prioritized and routed locally. The emergency call can be transmitted via VoIP service.

The methods and systems presented below may be of various types. The individual elements described may be realized by hardware or software components, for example electronic components that can be manufactured by various technologies and include, for example, semiconductor chips, application-specific integrated circuits (ASICs), microprocessors, digital signal processors, integrated electrical circuits, electro-optical circuits and/or passive components.

The devices, systems and methods presented below are capable of transmitting information over a communication network. The term communication network or communication network refers to the technical infrastructure on which the transmission of signals takes place. The communication network comprises the switching network in which the transmission and switching of the signals takes place between the stationary devices and platforms of the mobile radio network or fixed network, and the access network in which the transmission of the signals takes place between a network access device and the communication terminal. The communication network can comprise both components of a mobile radio network as well as components of a fixed network. In the mobile network, the access network is also referred to as an air interface and includes, for example, a base station (NodeB, eNodeB, radio cell) with mobile antenna to establish the communication to a communication terminal as described above, for example, a mobile phone or a mobile device with mobile adapter or a machine terminal. In the fixed network, the access network includes, for example, a DSLAM (digital subscriber line access multiplexer) to connect the communication terminals of multiple participants based on wires. Via the switching network the communication can be transferred to other networks, for example other network operators, e.g. foreign networks.

The communication networks presented below may include various technologies and network standards, for example according to the 5G system architecture. This includes the concept of network slicing. Network slicing is a form of virtual network architecture that uses the same principles as software-defined networking (SDN) and network functions virtualization (NFV) in fixed networks. SDN and NFV are used to provide greater network flexibility by partitioning traditional network architectures into virtual elements that can be linked together, even through software.

Network slicing allows multiple virtual networks to be created on a common physical infrastructure. The virtual networks are then adapted to the specific needs of applications, services, devices, customers or operators.

Each virtual network (network slice) comprises an independent set of logical network functions that support the needs of the particular use case, where the term "logical" refers to software.

Each of these virtual networks or network slices is optimized to provide the resources and network topology for the particular service and traffic using the corresponding segment. Features such as speed, capacity, connectivity, and coverage are assigned to meet the specific needs of each use case, but functional components can also be shared across different network slices.

Each network slice can be completely isolated, so that no network slice can disturb the traffic in another network slice. This reduces the risk of introducing and operating new services and also supports migration as new technologies or architectures can be started on isolated slices. It also affects security, because if a cyber-attack breaks a slice, the attack is contained and cannot spread beyond that slice.

Each network slice is configured with its own network architecture, engineering mechanism, and network deployment. To do this, each network slice can receive management capabilities that can be controlled by the network operator or the customer depending on the application. The network slices can be independently managed and orchestrated.

In the roaming scenario, when starting operation of the communication terminal, i.e. the mobile terminal, the machine terminal such as of the self-driven car or drone, also denoted herein as a user equipment (UE), currently a complex procedure is necessary when the UE is located in the visited network or in an external communication network. This procedure is necessary in order to fetch the subscriber-specific data of the UE from the home communication network, also denoted as home PLMN (Public Land Mobile Network) and to inform the UE. These subscriber-specific data of the UE can for example include registration and/or authentication data of the UE in the visited PLMN, such as identification and telephone number, e.g. IMSI (International Mobile Subscriber Identity) or IMEI (International Mobile Equipment Identity) or SIM ID (Subscriber Identity Module Identity). Further, for logging into the visited network, also referred to as visited PLMN, allowed capabilities and/or policies of the visited PLMN, e.g. network technology, support for certain services, etc. are required.

According to a first aspect the invention relates to a method for processing an emergency message in a communication network, in particular a local public land mobile network (PLMN), the method comprising: transmitting, by a user equipment (UE), an emergency message to an access network entity of a network slice of the communication network, wherein the emergency message comprises an emergency identifier (E_ID); detecting by the access network entity of the network slice of the communication network, based on the E_ID, that the emergency message is related to emergency; forwarding the emergency message to an emergency network slice of the communication network based on the emergency detection; and establishing, by the emergency network slice, a communication link between the UE and a public safety answering point (PSAP) for processing the emergency message.

This provides the advantage that the emergency network slice represents a specific network resource reserved for emergency calls. Hence emergency situations can be processed faster since special resources are available for these emergency calls. An emergency call slice (that may include a RAN and a core network slice) is thus provided so that the emergency call does not have to leave the slice and can be prioritized and routed locally. The emergency call can be transmitted via VoIP service.

In an exemplary implementation, the method comprises: forwarding the emergency message to the emergency network slice via a dedicated communication interface (E1, E2) between the access network entity of the network slice of the communication network and an access network entity of the emergency network slice.

This provides the advantage that special interfaces are reserved for transmitting and processing emergency calls. This improves reaction times since the emergency message can traverse any congestion or overload in the overall network.

In an exemplary implementation, the method comprises: configuring a routing table in the access network entity, in particular in a radio access network (RAN) entity or in an AMF entity, of the communication network for forwarding the emergency message to the emergency network slice.

This provides the advantage that the routing table can speed up forwarding of emergency messages. For example, based on the emergency identifier E_ID in the emergency message, the routing table can separate emergency messages from normal message routes. This accelerates emergency message processing.

In an exemplary implementation, the method comprises: creating a route in the routing table between the UE and the emergency network slice based on an identity (UE ID) of the UE and an identifier of the dedicated communication interface (E1, E2), wherein the UE ID is comprised in the emergency message and the identifier of the dedicated communication interface (E1, E2) is known.

This provides the advantage that the routes in the routing table can be created very efficiently since only the UE ID that is transported by the emergency message and the interface identifiers which are known in the respective network entities are required to create these routes. Alternatively, the UE ID can be detected by the access network element of the network slice to which the UE connects, e.g. by the RAN entity of the AMF entity.

In an exemplary implementation, the method comprises: increasing a priority of the route between the UE and the emergency network slice with respect to other routes in the routing table that are not directed to the emergency network slice.

This provides the advantage that emergency message can be processed faster than any other messages.

In an exemplary implementation, the method comprises: transmitting a hand-over message, by the access network entity of the network slice of the communication network, to the UE, wherein the hand-over message requests the UE to connect to a specific RAN entity of the emergency network slice which is configured to process emergency messages.

This provides the advantage that the UE can be advised to connect to a specific RAN entity that has enough free resources for a fast processing of the emergency call or messages. Hence emergency situations can be processed and served very efficiently.

In an exemplary implementation of the method, the specific RAN entity of the emergency network slice is a dedicated emergency RAN entity of the communication network or is formed from RAN resources of the access network entity of the network slice of the communication network which RAN resources are reserved for processing emergency messages.

This provides the advantage that the design of the communication network can be flexibly handled. Either the usual RAN entity of the serving network slice has a special portion of resources reserved for emergency situations or a special RAN entity (e.g. of emergency network slice) is used for serving the emergency messages.

In an exemplary implementation, the method comprises: detecting by the access network entity of the communication network, that the emergency message is from a roaming UE, wherein the detection is based on an identity (UE ID) of the UE comprised in the emergency message; and forwarding the emergency message from the roaming UE to the emergency network slice for processing the emergency message in the communication network.

This provides the advantage that for the roaming UE, emergency messages are processed in the local PLMN, i.e. in the visited PLMN without the need to contact its home PLMN. This accelerates emergency processing.

In an exemplary implementation, the method comprises: detecting by the access network entity of the communication network, a location of the UE to obtain a location identifier, in particular a location area code (LAC) or a tracking area code (TAC) of the UE; and forwarding the emergency message together with the location identifier to the emergency network slice.

This provides the advantage that the location of the user (of UE) can be automatically detected. No help or assistance of the user is thus necessary. This makes emergency solution more efficient.

In an exemplary implementation, the method comprises: determining, by the emergency network slice, based on the E_ID, a specific IP multimedia subsystem (IMS) application function (AF) for enabling voice-over-IP functionality; and establishing, by the emergency network slice the communication link between the UE and the PSAP based on the specific IMS AF.

This provides the advantage that call messages can be forwarded for assistance in solving the emergency situation.

In an exemplary implementation, the method comprises: determining, by the emergency network slice, the PSAP for processing the emergency message from a plurality of PSAPs based on a location of the UE and a type of the emergency message.

This provides the advantage that the suitable PSAP can be detected, e.g. a PSAP in proximity to the user. This accelerates solving the emergency situation.

According to a second aspect, the invention relates to an emergency network slice of a communication network, in particular of a local communication network, the emergency network slice comprising: a network access entity, in particular an AMF entity configured to: receive an emergency message via the communication network from a user equipment (UE), wherein the emergency message comprises an emergency identifier (E_ID) and an identity (UE ID) of the UE; and establish, a communication link between the UE and a public safety answering point (PSAP) for processing the emergency message based on the E_ID and the UE ID.

Such an emergency network slice represents a specific network resource reserved for emergency calls. Hence by such an emergency network slice, emergency situations can be processed faster since special resources are available for these emergency calls. The emergency call slice (that may include a RAN and a core network slice) is thus provided so that the emergency call does not have to leave the slice and can be prioritized and routed locally. The emergency call can be transmitted via VoIP service.

In an exemplary implementation of the emergency network slice, the network access entity is configured to: determine, based on the E_ID, a specific IP multimedia subsystem (IMS) application function (AF) for enabling voice-over-IP functionality; and establish the communication link between the UE and the PSAP based on the specific IMS AF.

This provides the advantage that call messages can be forwarded for assistance in solving the emergency situation.

According to a third aspect, the invention relates to an access network entity of a communication network, in particular a network slice of a local communication network, the access network entity comprising: a communication interface configured to receive an emergency message from a user equipment (UE) and to transmit the emergency message to an emergency network slice of the communication network, wherein the emergency message comprises an emergency identifier (E_ID); and a processor configured to detect, based on the E_ID, that the emergency message is related to emergency and to forward the emergency message based on the emergency detection via the communication interface to the emergency network slice.

Such an access network entity provides the advantage that it can efficiently forward emergency messages to an emergency network slice that represents a specific network resource reserved for emergency calls. Hence by such an access network entity (together with emergency network slice), emergency situations can be processed faster since special resources are available for these emergency calls. The emergency call slice (that may include a RAN and a core network slice) is thus provided so that the emergency call does not have to leave the slice and can be prioritized and routed locally. The emergency call can be transmitted via VoIP service.

In an exemplary implementation the access network entity comprises a routing table configured to store routes for forwarding the emergency message to the emergency network slice.

This provides the advantage that the routing table can speed up forwarding of emergency messages. For example, based on the emergency identifier E_ID in the emergency message, the routing table can separate emergency messages from normal message routes. This accelerates emergency message processing.

In an exemplary implementation of the access network entity, the processor is configured to increase a priority of routes of the routing table which are directed to the emergency network slice with respect to other routes of the routing table that are not directed to the emergency network slice.

This provides the advantage that emergency messages can be faster processed than other messages.

According to a fourth aspect, the invention relates to a communication system, in particular a 5G communication system, comprising: a network slice of the communication network comprising the network entity according to the third aspect; and an emergency network slice according to the second aspect.

Such a communication system provides the advantage that the emergency network slice represents a specific network resource reserved for emergency calls. Hence emergency situations can be processed faster since special resources are available for these emergency calls. An emergency call slice (that may include a RAN and a core network slice) is thus provided so that the emergency call does not have to leave the slice and can be prioritized and routed locally. The emergency call can be transmitted via VoIP service.

According to a fifth aspect the invention relates to a computer program product comprising program code for performing the method according to the first aspect of the invention, when executed on a computer or a processor.

Embodiments of the invention can be implemented in hardware and/or software.

In the following detailed description, reference is made to the accompanying drawings, which form part of the disclosure, and in which are shown, by way of illustration, exemplary aspects in which the present invention may be placed. It is understood that other aspects may be utilized and structural or logical changes may be made without departing from the scope of the present invention. The following detailed description, therefore, is not to be taken in a limiting sense, as the scope of the present invention is defined by the appended claims.

For instance, it is understood that a disclosure in connection with a described method may also hold true for a corresponding device or system configured to perform the method and vice versa. For example, if a specific method step is described, a corresponding device may include a unit to perform the described method step, even if such unit is not explicitly described or illustrated in the figures. Further, it is understood that the features of the various exemplary aspects described herein may be combined with each other, unless specifically noted otherwise.

The following describes network entities such as network access entities and functions of such a network access entity or radio access network (RAN) entities. The network access entity enables access and mobility management in the communication network. Via the network access entity, communication terminals with their identity (UE ID) can register in the communication network and receive the permission to set up a communication connection. For example, in the 5G communication network, the network access entity may be an AMF (Access and Mobility Management Function) representing the access and mobility management function. This manages the access and mobility control. The AMF may also include network slice selection functionality. For wireless access, mobility management is not needed. The network access entity may be, for example, an MME (mobility management entity) in the 4G communication network. The MME is a network component of the LTE (Long Term Evolution) mobile radio standard, which performs the functions of paging to set up calls and generally communication links as well as signaling for control purposes. The MME forms the link between core network and access network. The MME manages the locations of all mobile communication terminals in the radio cells connected to it. In the LTE system, several cells are usually combined to form a tracking area. The management area of an MME can be divided into several tracking areas.

The radio access network (RAN) is part of a mobile telecommunication system. It implements a radio access technology (RAT). Conceptually, it resides between a device such as a mobile phone, a computer, or any remotely controlled machine and provides connection with its core network (CN). Depending on the standard, mobile phones and other wireless connected devices are varyingly known as user equipment (UE), terminal equipment, mobile station (MS), etc. RAN functionality is typically provided by a RAN entity, e.g. a silicon chip, residing in both the core network as well as the user equipment. Examples of radio access network types are GERAN (GSM EDGE Radio Access Network), the GSM (Global System for Mobile Communications) radio access network including EDGE (Enhanced Data for GSM Evolution) packet radio services, UTRAN (UMTS Terrestrial Radio Access Network), the UMTS (Universal Mobile Telecommunications Service) radio access network, E-UTRAN (Evolved UMTS Terrestrial Radio Access Network), the LTE radio access network and the 5G RAN. The RAN entity can for example include a base station, e.g. a NodeB or and eNodeB or a 5G capable radio cell.

The network access entity further provides the technical function of first establishing a security relationship with a previously unknown security device, in order to then be able to install security elements (keys) in the device itself and in the network application function (NAF) of the network access function. For example, the Diameter and Hypertext Transfer Protocol (http) protocols can be used. For example, SOAP may be used between BSF (bootstrapping server function) and NAF instead of diameter.

Involved in the maintenance of such a generic security relationship are the following functional elements: terminal, e.g. a mobile phone, i.e. User Equipment (UE), which wants to use a particular service, application server that provides the service, e.g. for Mobile TV, VoLTE (Voice over LTE), VoIP, FTP (file transfer protocol) data transfer, media streaming, Internet browsing, etc., Network Application Function (NAF), the network access entity itself, which establishes a security relationship between UE and NAF and a database of the home network, e.g. HSS Home Subscriber Server (HSS) or UDR (unified data repository) of the (mobile) network provider, which manages the respective user-specific profiles of its terminal users.

The network access entity network access feature is consulted by the application server (NAF) after a terminal has requested service access from it. Since the application server does not yet know the terminal at this time, it first refers this to the network access function. The terminal and the network access function now authenticate to each other; this can be done, for example, via the AKA protocol (Authentication and Key Agreement) and by inquiring the network access function to the Home Subscriber Server (HSS) or the UDR database of the home network. Subsequently, the network access function and the terminal (UE) agree on a session key to be used for encrypted data exchange with the application server (NAF). If the terminal now again turns to the application server, it can obtain both the session key and subscriber-specific data from the network access function and start the data exchange with the terminal (UE). The appropriate session keys are used for cryptographic protection.

The security relationship itself between terminal and network access entity never leaves the sovereignty of the (mobile) network operator, only data derived from this security relationship (key) can be queried and used by applications.

In particular, the network entities described in this disclosure are intended to facilitate the serving of an emergency call, in particular in the roaming scenario for establishment of a roaming connection of the communication terminal, as described below in this disclosure.

Figure 1:
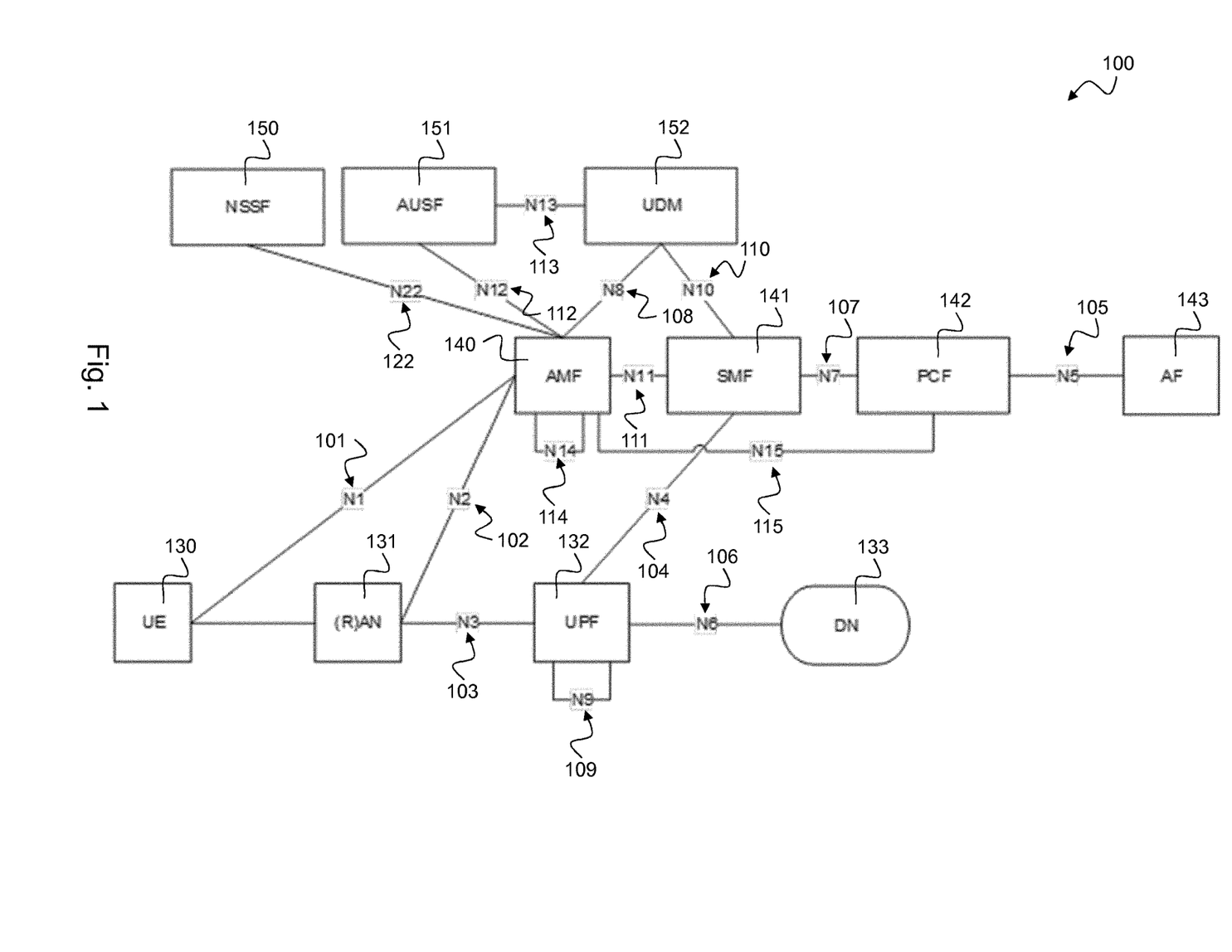
FIG. 1 shows a schematic diagram illustrating a system architecture of a 5G communication network 100.

FIG. 1 shows a schematic diagram illustrating a system architecture of a 5G communication network 100. The 5G system architecture 100 comprises the network functions illustrated in the individual blocks of FIG. 1.

The UE (User Equipment) block 130 represents the user equipment or client terminal or mobile communication device which can be operated by the subscriber to initiate communication in the 5G network, i.e. starting a communication (mobile originating, MO) or accepting (mobile terminating, MT). The UE can also initiate communication without user interaction, e.g. it can be a machine terminal, e.g. for a car or a robot or other device.

The block (R)AN ((radio) access network) 131 represents the (radio) access network by which the UE 130 obtains access to the 5G communication network. The interface between UE 130 and (R)AN is either an air interface when the access network 131 is a wireless network or wired when the access network is a wired network.

The Access and Mobility Management Function (AMF) block 140 represents the access and mobility management function. It manages the access and mobility functions of the UE. The AMF may also include network slice selection functionality. For wireless access, mobility management is not needed.

The Session Management Function (SMF) block 141 represents the session management function. It sets up sessions and manages them according to the network policy.

The User Plane Function (UPF) block 132 represents the User Plane function. UPFs can be applied in various configurations and locations, according to the service type.

The Policy Control Function (PCF) block 142 represents the policy control function. It provides a policy framework that includes network slicing, roaming, and mobility management. This corresponds to the functionality of a PCRF in 4G systems.

The block UDM (Unified Data Management) 152 provides a shared data management. This saves subscriber data and profiles. This is equivalent to the functionality of an HSS in 4G systems, but is used for both mobile and wired access in the NG Core network.

The block DN (Data Network) 133 provides the data network over which data is transmitted, e.g. from one UE to another UE.

The block AUSF (Authentication Server Function) 151 provides authentication functionality with which the subscriber or the UE can log on to the network.

The AF (Application Function) block 143 provides application functions that enable certain services to be executed.

The NSSF block (Network Slice Selection Function) 150 provides functions to select particular network slices.

The 5G system architecture shown in FIG. 1 represents the structure of the NG (Next Generation) network, which includes network functions (NFs) and reference points connecting the NFs. The UE 130 is connected to either a Radio Access Network (RAN) 131 or an Access Network (AN) 131. In addition, the UE 130 is connected to the Access and Mobility Function (AMF) 140. The RAN 131 represents a base station using new RAT and advanced LTE technologies, while the AN 131 is a general base station with non-3GPP access, e.g. a WiFi Access Point. The Next Generation core network 100 includes various network functions (NFs). In FIG. 1, there are seven Next Generation core NFs, namely (1) AMF 140, (2) Session Management Function (SMF) 141, (3) Policy Control Function (PCF) 142, (4) Application Function (AF) 143, (5) Authentication Server Function (AUSF) 151, (6) User Plane Function (UPF) 132, and (7) User Data Management (UDM) 152.

The network function (NF) represents the processing function inherited from 3GPP in NextGen or NG. It has both functional behavior and serves as an interface. An NF can either be implemented as a network element (or network entity) on dedicated hardware, as a software instance on dedicated hardware, or instantiated as a virtualized function on a suitable platform, e.g. B. a cloud infrastructure.

The AMF 140 provides UE-based authentication, authorization, mobility management, etc. A UE 130 is basically connected to a single AMF 140 because the AMF 140 is independent of the access technology. That means, also a UE 130 with multiple access technologies is only connected to a single AMF 140.

The SMF 141 is responsible for session management and assigns IP addresses to the UEs 130. In addition, the SMF 141 selects the UPF 132 and controls the UPF 132 for data transfer. If a UE 130 has multiple sessions, different SMFs 141 may be associated with each session to individually control them and possibly provide multiple functionalities per session.

The AF 143 provides information about the packet flow and provides it to the PCF 142, which is responsible for policy control to ensure Quality of Service (QoS). Based on this information, PCF 142 will determine the Mobility and Session Management policies for the AMF 140 and SMF 141 to function properly.

The AUSF 151 stores data for authentication of the UE 130 while the UDM 152 stores subscription data of the UE 130. The data network DN 133, which is not part of the NG core network 100, provides Internet access and operator services.

The architectural reference point view can be used to represent detailed message flows in Next Generation (NG) standardization. The reference point Next Generation NG1 101 is defined as transmission signaling between the UE 130 and the AMF 140. The reference points for the connection between the AN 131 and the AMF 140 and between the AN 131 and the UPF 132 are referred to as NG 2 102 and NG3 103. There is no reference point between the AN 131 and the SMF 141, but there is a reference point, NG11 111, between the AMF 140 and the SMF 141. This means that the SMF 141 is controlled by the AMF 140. NG4 104 is used by the SMF 141 and the UPF 132 to allow the UPF 132 to be set with the generated control signal from the SMF 141, and the UPF 132 can report its status to the SMF 141. NG9 109 is the reference point for the connection between different UPFs 132 and NG14 114 is the reference point between different AMFs 140. NG15 115 and NG7 107 are defined in order for PCF 142 to apply its policies to AMF 140 and SMF 141, respectively. NG12 112 is required for the AMF 140 to perform authentication of the UE 130. NG8 108 and NG10 110 are defined because the subscription data of UE 130 is needed by AMF 140 and SMF 141.

The Next Generation Network 100 aims to realize a separation of user and control or control level. The user level transmits the user traffic, while the control level transmits the signaling on the network. In FIG. 1, the UPF 132 is in the user plane and all other network functions, i.e. AMF 140, SMF 141, PCF 142, AF 143, AUSF 151 and UDM 152 are in the control plane. Separation of user and control planes guarantees independent scaling of resources at each network level. The separation also allows the provision of UPFs 132 in a distributed manner separate from the functions of the control plane.

The NG Architecture 100 includes modularized functions. For example, AMF 140 and SMF 141 are independent functions in the control plane. Separate AMF 140 and SMF 141 allow independent development and scaling. Other control plane functions such as PCF 142 and AUSF 151 may be separated as shown in FIG. 1. The modularized functional design illustrated in FIG. 1 also enables the Next Generation Network 100 to flexibly support various services.

Each network function interacts directly with another NF. At the control level, a series of interactions between two NFs are defined as a service, so that they can be reused. This service allows support for modularity. The user level supports interactions such as forwarding operations between different UPFs 132.

The Next Generation Network 100 supports roaming similar to EPS (Enhanced Packet Switching). There are two types of application scenarios, Home Routed (HR) and Local Breakout (LBO). The structures that support roaming and the corresponding session management according to the concept presented here will be described in more detail below.

Figure 2:
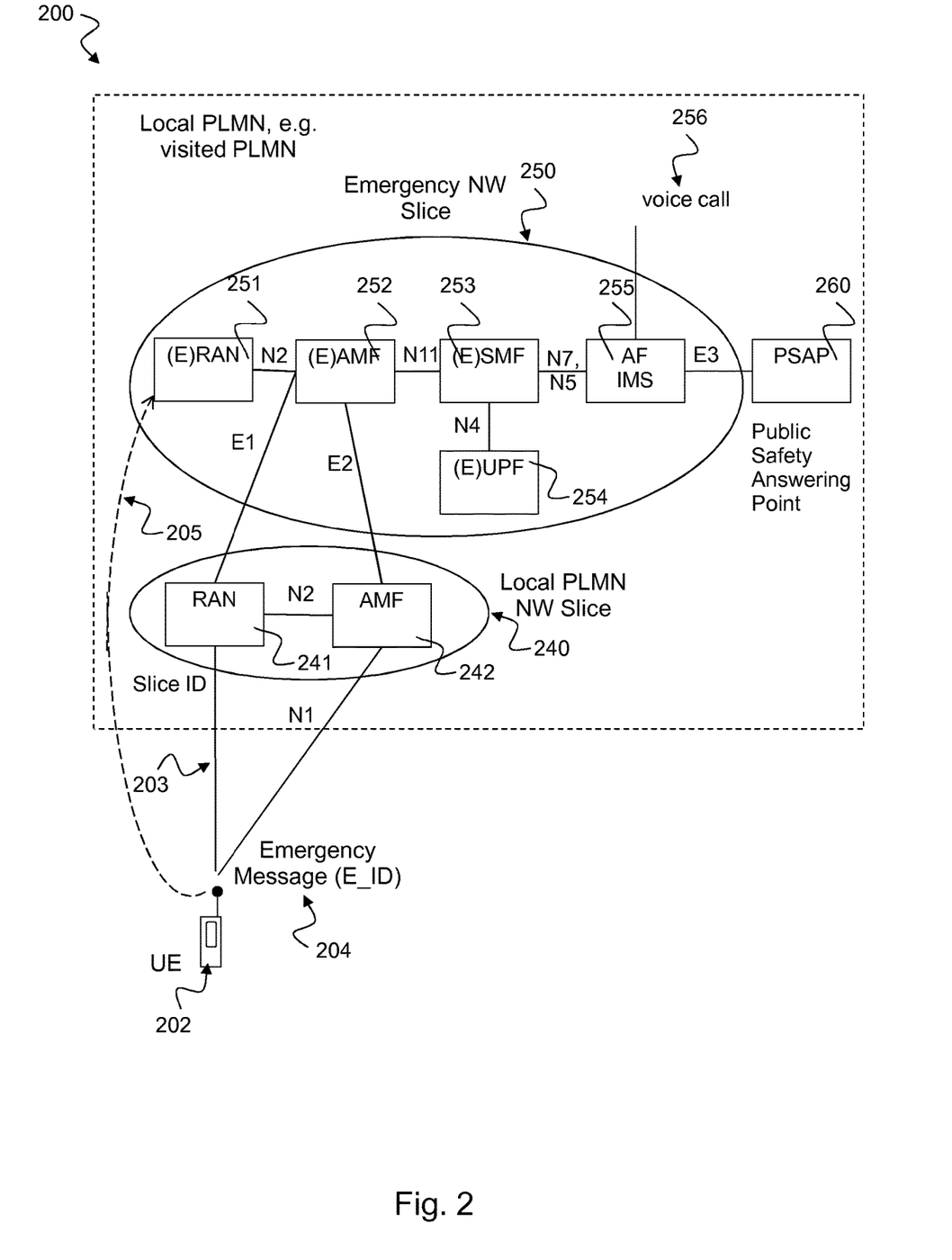
FIG. 2 shows a schematic diagram illustrating an exemplary local communication network 200, e.g. a visited communication network, with a local network slice 240 and an emergency network slice 250 according to the disclosure.

FIG. 2 shows a schematic diagram illustrating an exemplary communication network 200, e.g. a public land mobile network (PLMN) that can be a visited communication network for a roaming UE, with a network slice 240 and an emergency network slice 250 according to the disclosure.

The communication network 200, e.g. the public land mobile network (PLMN), includes one or more network slices 240 for serving a plurality of user equipments (UEs) 202 (for simplicity reasons only one UE is depicted in FIG. 2) and an emergency network slice 250 for serving emergency messages of the UE 202. Both, the network slice 240, also denoted as local PLMN network slice 240 herein, and the emergency network slice 250 can have a network structure and functionality as described above with respect to FIG. 1 for the 5G system architecture. The communication network 200 can have a plurality of such network slices 240, however for simplicity reasons, only one network slice 240 is shown here. The network slice 240 can be addressed by a Slice identifier (Slice ID) as shown in FIG. 2. The local PLMN network slice 240 includes a radio network access (RAN) entity 241 and an AMF entity 242 and further network entities as described above with respect to FIG. 1. The radio network access (RAN) entity 241 and the AMF entity 242 can both be referred to as access network entities. The communication network 200 forms a local communication network (or local PLMN) for the UE, since this network 200 is within a local distance of the UE 202, i.e. the base station or Access Point or radio cell of the local PLMN 200 is within radio coverage of the UE and the UE is able to connect to this local PLMN 200.

The emergency network slice 250 includes an (emergency) radio network access (RAN) entity 251, an (emergency) AMF entity 252, an (emergency) SMF entity 253, an (emergency) user plane function (UPF), an IP Multimedia Subsystem (IMS) Application Function (AF) and further network entities as described above with respect to FIG. 1. The AF IMS entity 255 can be used to establish a voice call 256, e.g. based on VoIP, to serve the emergency call. The emergency network slice 250 is coupled to a PSAP 260 that may be located inside the local PLMN 200 or outside the local PLMN 200. The radio network access (RAN) entity 241 and the AMF entity 242 can both be referred to as access network entities. The AMF 252 of the emergency network slice 250 is coupled via new communication interface E1 to the RAN entity 241 of the local PLMN network slice 240 and via new communication interface E2 to the AMF entity 242 of the local PLMN network slice 240. The UE 202 can connect to the RAN entity 241 of the local PLMN network slice 240 via air interface 203 or to the AMF entity 242 of the local PLMN network slice 240 via N2 interface as described above with respect to FIG. 1. The UE 202 may further connect to the RAN entity 251 (or also to the AMF entity 252) of the emergency network slice 250 via connection 205. The UE 202 can transmit an emergency message 204 to the local PLMN network slice 240, e.g. by dialing an emergency number such as "110" or "911".

Specifically, the method for processing an emergency message 204 in a communication network, includes the following steps:

In a first step, the UE 202 transmits an emergency message 204 to an access network entity, e.g. RAN entity 241 or AMF entity 242 of the network slice 240 of the communication network 200. The emergency message 204 comprises an emergency identifier (E_ID), e.g. a number such as "110" or "911".

In a second step, the access network entity 241, 242 of the network slice 240 of the communication network 200 detects, based on the E_ID, that the emergency message 204 is related to an emergency situation.

In a third step, the emergency message 204 is forwarded by the access network entity 241, 242 to an emergency network slice 250 of the communication network 200 based on the emergency detection.

In a fourth step, the emergency network slice 250 establishes a communication link between the UE 202 and the public safety answering point (PSAP) 260 for processing the emergency message 204.

The emergency message 204 can be forwarded to the emergency network slice 250 via a dedicated communication interface (E1, E2) between the access network entity, e.g. RAN entity 241 or AMF entity 242 of the network slice 240 of the communication network 200 and an access network entity, e.g. AMF entity 252 of the emergency network slice 250 as depicted in FIG. 2.

A routing table can be configured in the access network entity, e.g. RAN entity 241 or AMF entity 242, of the network slice 240 of the communication network 200 for forwarding the emergency message 204 to the emergency network slice 250. In the routing table a route can be created between the UE 202 and the emergency network slice 250, e.g. the AMF entity 252 of emergency network slice 250 based on an identity UE ID of the UE 202, e.g. a SIM ID, an IMSI, an IMEI, a MAC (media access control) address or an IP address, and an identifier of the dedicated communication interface E1, E2, e.g. a MAC address or a network address of the respective interface E1, E2. The UE ID can be included in the emergency message 204 and the identifier of the dedicated communication interface E1, E2 is known. For this route between the UE 202 and the emergency network slice 250 a priority may be increased with respect to other routes in the routing table that are not directed to the emergency network slice 250. Hence, emergency messages are processed first.

In an exemplary implementation, the access network entity, e.g. RAN entity 241 or AMF entity 242 of the network slice 240 (local PLMN NW slice) transmits a hand-over message to the UE 202 which requests or indicates the UE 202 to connect 205 to a specific RAN entity 251 of the emergency network slice 250 which is configured to process emergency messages. Then, the UE emergency communication can be directed via priority radio and priority core network elements to the PSAP 260. The specific RAN entity 251 of the emergency network slice 250 can be either a dedicated emergency RAN entity 251 of the communication network 200 or can alternatively be formed from RAN resources of the access network entity 241 of the network slice 240 or another network slice of the communication network 200 which RAN resources are reserved for processing emergency messages.

In an exemplary roaming scenario, the access network entity, e.g. RAN entity 241 or AMF entity 242 of the network slice 240 can detect whether or that the emergency message is from a roaming UE 202. This detection may be based on an identity UE ID of the UE 202 comprised in the emergency message 204. If a roaming scenario is detected, the emergency message 204 can be forwarded from the roaming UE 202 to the emergency network slice 250 for processing the emergency message 204 in the communication network 200.

The access network entity (241, 242) of the network slice 240 of the communication network 200 can detect a location of the UE to obtain a location identifier, in particular a location area code (LAC) or a tracking area code (TAC) of the UE 202. The emergency message 204 can be forwarded together with the location identifier to the emergency network slice 250. The emergency network slice 250 can determine, based on the E_ID, a specific IP multimedia subsystem (IMS) application function (AF) for enabling voice-over-IP functionality. The emergency network slice 250 can establish the communication link between the UE and the PSAP 260 based on the specific IMS AF. In particular, the emergency network slice 250 can determine the PSAP 260 for processing the emergency message 204 from a plurality of PSAPs based on a location of the UE 202 and a type of the emergency message 204.

The public-safety answering point (PSAP) is a call center responsible for answering calls to an emergency telephone number for e.g. police, firefighting, and ambulance services. Trained telephone operators are also usually responsible for dispatching these emergency services. Most PSAPs are capable of caller location for landline calls, and many can handle mobile phone locations as well, where the mobile phone company has a handset location system. Some can also use voice broadcasting, where outgoing voice mail can be sent to many phone numbers at once, in order to alert people to a local emergency such as a chemical spill or bad weather conditions.

FIG. 2 depicts the emergency network slice 250 of the local PLMN (or visited PLMN). Such emergency network slice 250 includes a network access entity 252, in particular an AMF entity 252 as depicted in FIG. 2 and further network elements as described above for the system architecture in FIG. 1. The AMF entity 252 is configured to: receive an emergency message 204 via a network slice 240 of the communication network 200 from a user equipment (UE) 202. The emergency message 204 comprises an emergency identifier (E_ID) and an identity (UE ID) of the UE. The AMF entity 252 is further configured to establish a communication link between the UE and a public safety answering point (PSAP) 260 for processing the emergency message 204 based on the E_ID and the UE ID.

The AMF entity 252 is further configured to determine, based on the E_ID, a specific IP multimedia subsystem (IMS) application function (AF) for enabling voice-over-IP functionality and to establish the communication link between the UE and the PSAP 260 based on the specific IMS AF.

In the following, an exemplary procedure of message transmission for processing the emergency message 204 is described.

1) User of UE 202 dials emergency number, e.g. "110" or "911".

2) UE 202 detects emergency number, and temporarily disables other services.

3) UE 202 initiates emergency call session number to local Visited PLMN 200 and signals emergency call 204.

4) Emergency call session setup arrives in the RAN 241, and continues to AMF 242.

5) AMF 242 recognizes that it is an emergency call session and routes call to a special emergency call slice 250; alternatively:

5a) RAN 241 recognizes that it is an emergency call session and routes call to AMF 252 in special emergency call slice 250 of local PLMN 200 (VPLMN 200 for in-bound roamer).

6) AMF 242 or AMF 252 in the emergency call slice 250 performs location detection, i.e. from where was Call sent, which SIM ID, IMEI, Location area code, etc.

7) In the emergency call slice 250, specific VoIP System PSAP is selected 255 and a specific PSAP 260 is selected based on the location and type of the emergency call.

8) Emergency call is routed to the selected PSAP 260.

9) Communication path is established between PSAP 260 and UE 202. Emergency call is operated.

Figure 3:
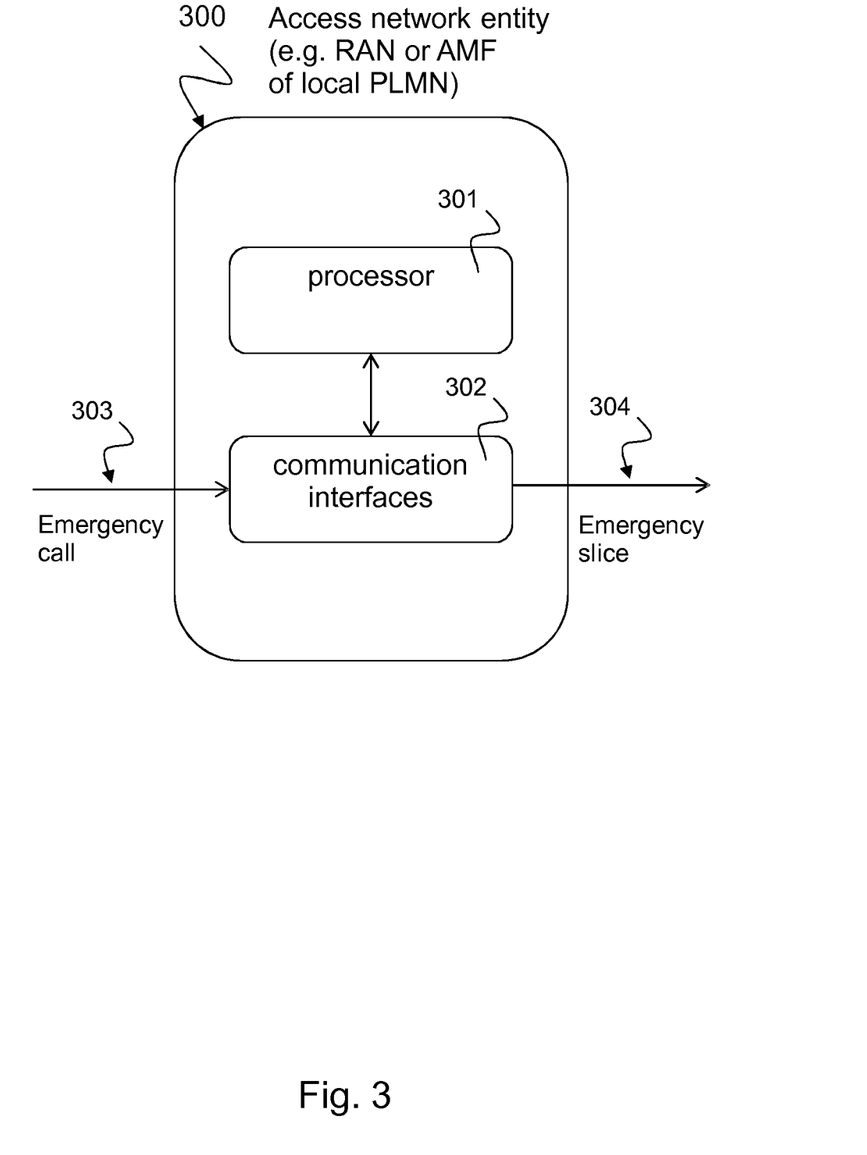
FIG. 3 shows a block diagram of an exemplary access network entity 300, e.g. a radio access network (RAN) entity 241 or an access and mobility management function (AMF) entity 242, of a local network slice 240 according to the disclosure.

FIG. 3 shows a block diagram of an exemplary access network entity 300, e.g. a RAN entity 241 or an AMF entity 242 of a network slice 240 of a local PLMN 200 according to the disclosure. The access network entity 300, 241, 242 includes a communication interface 302 configured to receive an emergency message 204 from a user equipment (UE) 202 and configured to transmit the emergency message 204 to an emergency network slice 250 of the communication network 240, e.g. as described above with respect to FIG. 2. The emergency message 204 comprises an emergency identifier (E_ID). The access network entity 300 further includes a processor 301. This processor 301 is configured to detect, based on the E_ID, that the emergency message 204 is related to emergency and is further configured to forward the emergency message 204 if an emergency is detected based on the E_ID, via the communication interface 302 to the emergency network slice 250. Emergency may be detected if the E_ID, e.g. a specific emergency number such as "110", "112" or "911" is present in the emergency message 204.

The access network entity 300, 241, 242 may include a routing table as described above with respect to FIG. 2 which is configured to store routes for forwarding the emergency message 204 to the emergency network slice 250. The processor 301 may be configured to increase a priority of routes of the routing table which are directed to the emergency network slice 250 with respect to other routes of the routing table that are not directed to the emergency network slice 250.

In an exemplary implementation the following exemplary functionality can be implemented by the local PLMN 200 as described in FIG. 2:

1) PSAP 260 can be always in the local network 200, i.e. in the roaming case in the Visited PLMN.

2) Anonymous emergency calls are possible, i.e. without SIM card in UE.

3) Authenticated emergency calls are not necessary, any emergency call can be served.

4) An own slice in Visited local NW can be installed for emergency call scenario—especially for in-bound roamer.

5) Emergency call slice with prioritization.

6) The slice may indicate to the UE which emergency numbers are available or the UE 202 has stored them.

7) By dialing the emergency number, the UE 202 initiates an emergency call via the emergency call slice, the network detects the emergency call.

This functionality provides the following advantages: The emergency network slice represents a specific network resource reserved for emergency calls. Hence emergency situations can be processed faster since special resources are available for these emergency calls. An emergency call slice (that may include a RAN and a core network slice) is thus provided so that the emergency call does not have to leave the slice and can be prioritized and routed locally. The emergency call can be transmitted via VoIP service.

Figure 4:
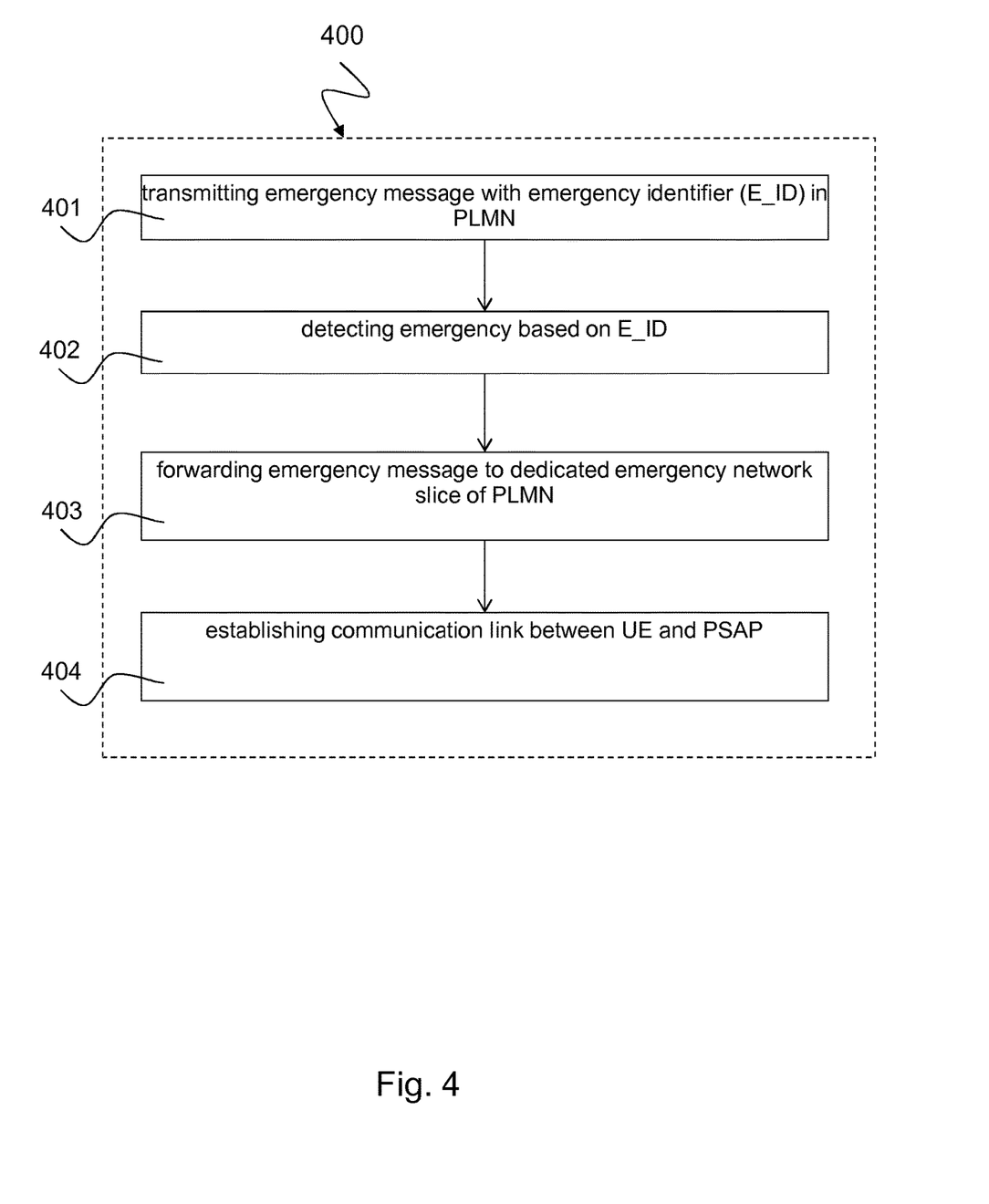
FIG. 4 shows a schematic diagram illustrating an exemplary method 400 for processing an emergency message in a communication network according to the disclosure.

FIG. 4 shows a schematic diagram illustrating an exemplary method 400 for processing an emergency message in a communication network, in particular a network slice of a local communication network 200 according to the disclosure.

In a first step 401, the method 400 includes: transmitting, by a user equipment (UE), an emergency message 204 to an access network entity 241, 242 of a network slice 240 of the communication network 200, wherein the emergency message 204 comprises an emergency identifier (E_ID), e.g. as described above with respect to FIGS. 2 and 3.

In a second step 402, the method 400 includes: detecting by the access network entity 241, 242 of the network slice 240, based on the E_ID, that the emergency message 204 is related to emergency, e.g. as described above with respect to FIGS. 2 and 3.

In a third step 403, the method 400 includes: forwarding the emergency message 204 to an emergency network slice 250 of the communication network 200 based on the emergency detection, e.g. as described above with respect to FIGS. 2 and 3.

In a fourth step 404, the method 400 includes: establishing, by the emergency network slice 250, a communication link between the UE 202 and a public safety answering point (PSAP) 260 for processing the emergency message 204, e.g. as described above with respect to FIGS. 2 and 3.

The method 400 may include further steps, such as, for example, according to the method steps described above with reference to FIGS. 2 and 3.

Another aspect of the invention is related to a computer program product comprising program code for performing the method 400 or the functionalities described above, when executed on a computer or a processor. The method 400 may be implemented as program code that may be stored on a non-transitory computer medium. The computer program product may implement the techniques described above with respect to FIGS. 2 to 4.

While a particular feature or aspect of the disclosure may have been disclosed with respect to only one of several implementations or embodiments, such feature or aspect may be combined with one or more other features or aspects of the other implementations or embodiments as may be desired and advantageous for any given or particular application. Furthermore, to the extent that the terms "include", "have", "with", or other variants thereof are used in either the detailed description or the claims, such terms are intended to be inclusive in a manner similar to the term "comprise". Also, the terms "exemplary", "for example" and "e.g." are merely meant as an example, rather than the best or optimal. The terms "coupled" and "connected", along with derivatives may have been used. It should be understood that these terms may have been used to indicate that two elements cooperate or interact with each other regardless whether they are in direct physical or electrical contact, or they are not in direct contact with each other.

Although specific aspects have been illustrated and described herein, it will be appreciated by those of ordinary skill in the art that a variety of alternate and/or equivalent implementations may be substituted for the specific aspects shown and described without departing from the scope of the present disclosure. This application is intended to cover any adaptations or variations of the specific aspects discussed herein.

Although the elements in the following claims are recited in a particular sequence, unless the claim recitations otherwise imply a particular sequence for implementing some or all of those elements, those elements are not necessarily intended to be limited to being implemented in that particular sequence.

Many alternatives, modifications, and variations will be apparent to those skilled in the art in light of the above teachings. Of course, those skilled in the art readily recognize that there are numerous applications of the invention beyond those described herein. While the present invention has been described with reference to one or more particular embodiments, those skilled in the art recognize that many changes may be made thereto without departing from the scope of the present invention. It is therefore to be understood that within the scope of the appended claims and their equivalents, the invention may be practiced otherwise than as specifically described herein.

While embodiments of the invention have been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for processing an emergency message in a communication network, in particular a local public land mobile network (PLMN), the method comprising:
    transmitting, by a user equipment (UE), an emergency message to an access network entity of a network slice of the communication network, wherein the emergency message comprises an emergency identifier (E_ID);
    detecting by the access network entity of the network slice of the communication network, based on the E_ID, that the emergency message is related to an emergency;
    forwarding the emergency message to an emergency network slice of the communication network based on the emergency detection; and
    establishing, by the emergency network slice, a communication link between the UE and a public safety answering point (PSAP) for processing the emergency message.

2. The method of claim 1, further comprising:
    forwarding the emergency message to the emergency network slice via a dedicated communication interface between the access network entity of the network slice and an access network entity of the emergency network slice.

3. The method of claim 2, further comprising:
    configuring a routing table in the access network entity of the network slice, in particular in a radio access network (RAN) entity or in an access and mobility management function (AMF) entity of the network slice for forwarding the emergency message to the emergency network slice.

4. The method of claim 3, further comprising:
    creating a route in the routing table between the UE and the emergency network slice based on an identity (UE ID) of the UE and an identifier of the dedicated communication interface, wherein the UE ID is comprised in the emergency message and the identifier of the dedicated communication interface is known.

5. The method of claim 4, further comprising:
    increasing a priority of the route between the UE and the emergency network slice relative to other routes in the routing table that are not directed to the emergency network slice.

6. The method of claim 1, further comprising:
    transmitting a hand-over message, by the access network entity of the network slice, to the UE, wherein the hand-over message requests the UE to connect to a specific emergency radio access network (RAN) entity which is configured to process emergency messages.

7. The method of claim 6, wherein the specific emergency RAN entity is a dedicated emergency RAN entity of the emergency network slice or is formed from RAN resources of the access network entity of the network slice, wherein the RAN resources are reserved for processing emergency messages.

8. The method of claim 1, further comprising:
    detecting, by the access network entity of the network slice, that the emergency message is from a roaming UE, wherein the detection is based on an identity (UE ID) of the UE comprised in the emergency message; and
    forwarding the emergency message from the roaming UE to the emergency network slice for processing the emergency message.

9. The method of claim 1, further comprising:
    detecting, by the access network entity of the network slice, a location of the UE to obtain a location identifier, in particular a location area code (LAC) or a tracking area code (TAC) of the UE; and
    forwarding the emergency message together with the location identifier to the emergency network slice.

10. The method of claim 9, further comprising:
    determining, by the emergency network slice, based on the E_ID, a specific IP multimedia subsystem (IMS) application function (AF) for enabling voice-over-IP functionality; and
    establishing, by the emergency network slice the communication link between the UE and the PSAP based on the specific IMS AF.

11. The method of claim 1, further comprising:
    determining, by the emergency network slice, the PSAP for processing the emergency message from a plurality of PSAPs based on a location of the UE and a type of the emergency message.

12. An emergency network slice of a communication network, in particular of a local public land mobile network (PLMN), the emergency network slice comprising:
    a network access entity, in particular an access and mobility management function (AMF) entity, configured to:
    receive an emergency message via a network slice of the communication network from a user equipment (UE), wherein the emergency message comprises an emergency identifier (E_ID) and an identity (UE ID) of the UE; and
    establish a communication link between the UE and a public safety answering point (PSAP) for processing the emergency message based on the E_ID and the UE ID.

13. The emergency network slice of claim 12, wherein the network access entity is further configured to:
    determine, based on the E_ID, a specific IP multimedia subsystem (IMS) application function (AF) for enabling voice-over-IP functionality; and
    establish the communication link between the UE and the PSAP based on the specific IMS AF.

14. An access network entity of a communication network, in particular of a network slice of a local public land mobile network (PLMN), the access network entity comprising:
    a communication interface configured to receive an emergency message from a user equipment (UE) and to transmit the emergency message to an emergency network slice of the communication network, wherein the emergency message comprises an emergency identifier (E_ID); and
    a processor configured to detect, based on the E_ID, that the emergency message is related to an emergency and to forward the emergency message via the communication interface to the emergency network slice.

15. The access network entity of claim 14, further comprising:
a routing table configured to store routes for forwarding the emergency message to the emergency network slice;
wherein the processor is further configured to increase a priority of routes of the routing table which are directed to the emergency network slice relative to other routes of the routing table that are not directed to the emergency network slice.

* * * * *